United States Patent

Dunaway et al.

[11] Patent Number: 4,686,824
[45] Date of Patent: Aug. 18, 1987

[54] GASEOUS SECONDARY INJECTION THRUST VECTOR CONTROL DEVICE

[75] Inventors: J. C. Dunaway, Falkville; Paul L. Jacobs, Huntsville, both of Ala.

[73] Assignee: United States of America as Represented by the Secretary of the Army, Washington, D.C.

[21] Appl. No.: 362,017

[22] Filed: Mar. 25, 1982

[51] Int. Cl.⁴ ............................ F02K 1/00; F02K 1/28
[52] U.S. Cl. ............................ 60/231; 239/265.23; 137/812; 60/254
[58] Field of Search ............... 239/265.23; 137/810, 137/812; 60/254, 231, 39.47

[56] References Cited

U.S. PATENT DOCUMENTS

| | | | |
|---|---|---|---|
| 3,134,225 | 5/1964 | Pennington, Jr. | 60/254 |
| 3,195,303 | 7/1965 | Widell | 60/231 |
| 3,228,188 | 1/1966 | Sargent et al. | 60/254 |
| 3,270,505 | 9/1966 | Crabill et al. | 239/265.23 X |
| 3,285,262 | 11/1966 | Ernst et al. | 60/231 |
| 3,300,978 | 1/1967 | Pennington | 60/231 |
| 3,324,891 | 6/1967 | Rhoades | 137/812 |
| 3,407,828 | 10/1968 | Jones | 137/810 X |
| 3,410,291 | 11/1968 | Boothe et al. | 137/812 |
| 3,548,598 | 12/1970 | Colombani et al. | 239/265.23 X |
| 3,759,039 | 9/1973 | Williams | 60/231 |

Primary Examiner—Carlton R. Croyle
Assistant Examiner—Donald E. Stout
Attorney, Agent, or Firm—Freddie M. Bush; James T. Deaton

[57] ABSTRACT

Apparatus for modulating the thrust vector of a rocket motor by injecting hot gas into the divergent section of the rocket nozzle and modulating injection of the hot gas by varying the flow from a solid propellant gas generator by controlling its flow rate with a vortex throttling valve arrangement.

3 Claims, 6 Drawing Figures

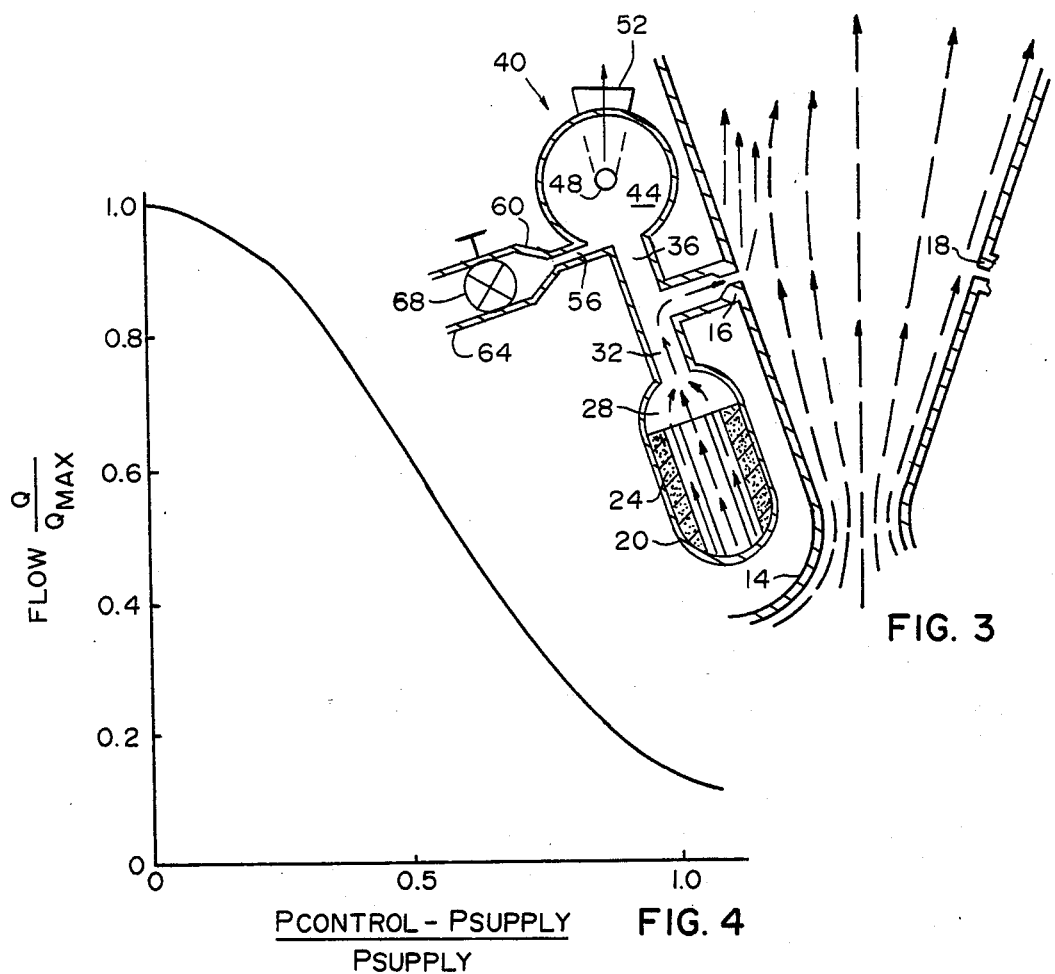
FIG. 3
FIG. 4
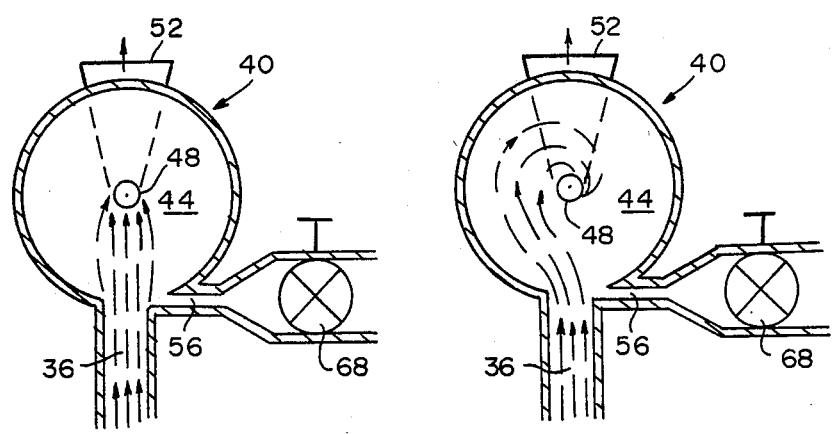
FIG. 5
FIG. 6

GASEOUS SECONDARY INJECTION THRUST VECTOR CONTROL DEVICE

DEDICATORY CLAUSE

The invention described herein may be manufactured, used, and licensed by or for the Government for governmental purposes without the payment to us of any royalties thereon.

BACKGROUND OF THE INVENTION

In the past, secondary injection thrust vector control devices have used throttling characteristics of mechanical or fluidic valves that modulate one-hundred percent of the gas flow rate and hence the thrust vector control force. There is a need for a secondary injection thrust vector control device that makes use of a controllable burning rate hot gas generator as the throttling or modulating means and a control device that uses only about 10 percent mechanical valving of the hot gas flow compared to a 100 percent mechanical valving of the flow of other systems.

Therefore, it is an object of this invention to provide a gaseous secondary injection thrust vector control device that utilizes a vortex valve and therefore requires only about 10 percent of the injection gas to be mechanically throttled or valved in controlling the gas flow rate and hence the thrust vector control force the rocket motor.

Another object of this invention is to provide a gaseous secondary injection thrust vector control device which utilizes valving means that can be of reduced size and cost due to only about 10 percent of the hot gas flow being mechanically valved.

Other objects and advantages of this invention will be obvious to those skilled in this art.

SUMMARY OF THE INVENTION

In accordance with this invention, a gaseous secondary injection thrust vector control device is provided which includes a rocket motor that has a convergent-divergent nozzle with secondary injection nozzles located 180 degrees apart for injection of hot gas from hot gas generators and vortex valves and control valve means connected for controlling the burning rate of the hot gas generators and therefore the gas pressures produced thereby to control the amount of hot gas injected through the secondary injection of the rocket motor.

BRIEF DESCRIPTION OF DRAWINGS

FIG. 3 is a schematic sectional view illustrating injection of the gases from the opposite side of the divergent rocket motor nozzle, FIG. 4 is a curve illustrating the characteristics of the typical vortex valve used in the control of this device, FIG. 5 is a schematic illustration of flow from the inlet port to the outlet port with no control flow, and FIG. 6 is a schematic illustration with control flow applied to fluid at the inlet port.

DESCRIPTION OF THE PREFERRED EMBODIMENT

Figure 1:
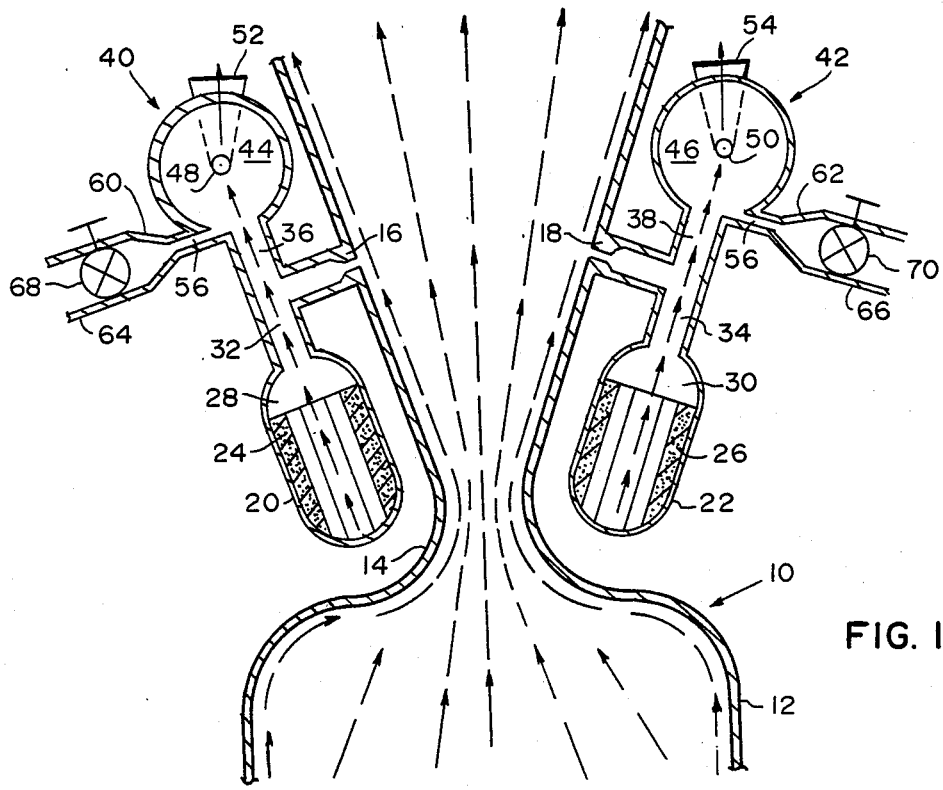
FIG. 1 is a schematic sectional view of a gaseous secondary injection thrust vector control device in accordance with this invention.

Referring now to FIG. 1, a gaseous secondary injection thrust vector control system 10 in accordance with this invention includes a rocket motor 12 with a convergent-divergent nozzle 14 which has secondary injection nozzles 16 and 18 located 180 degrees apart. If more than a single axis of secondary injection is desired, a second set of secondary injection nozzles can be located 180 degrees apart and 90 degrees from each of injection nozzles 16 and 18. Hot gas generators 20 and 22 have solid propellants 24 and 26 mounted therein and gas generators 20 and 22 have internal chambers 28, 30 defined therein with outlets 32 and 34 connecting gas generators 20 and 22 to injection nozzles 16 and 18 and to inlet openings 36 and 38 of fluid valve means or vortex valves 40 and 42. Vortex valves 40 and 42 are each cylindrical in shape to define chambers 44 and 46 therein. Inlet openings 36 and 38 each open at a circumference of chambers 44 and 46 and inlet openings 36 and 38 are large in comparison to outlets 48 and 50 from chambers 44 and 46. Preferably, inlet openings 36 and 38 are at least twice as large as outlets 48 and 50. As illustrated, inlet openings 36 and 38 are perpendicular to outlets 48 and 50. Outlets 48 and 50 communicate to the atmosphere through outlet conduits 52 and 54. Vortex valves 40 and 42 also have control ports 56 and 58 which open tangentially into chambers 44 and 46 with control ports 56 and 58 preferably being perpendicular to valve inlet openings 36 and 38. Control ports 56 and 58 are small in size compared to valve inlet nozzles 36 and 38 and are also smaller than outlets 48 and 50. Control ports 56 and 58 are connected by conduits 60 and 62 to sources adapted to be connected at inlets 64 and 66. Conduits 60 and 62 each have control modulating valves 68 and 70 for controlling flow from the source through inlets 64 and 66 to outlets 48 and 50.

As can be appreciated, this invention involves three basically distinct mechanisms in producing the desired results of this invention with these mechanisms including a gaseous secondary injection arrangement, particular gas generator arrangement characteristics, and vortex valve with particular operating characteristics for causing the control system to function as desired. First, the gaseous secondary injection utilizes a thrust vector control arrangement which uses the injection of a gas through nozzles 16 or 18 into the divergent section of the rocket nozzle 14 to create an oblique shock which diverts part of the rocket nozzle flow and creates a pressure imbalance in the rocket nozzle which results in the generation of a side force perpendicular to the center line of the rocket nozzle. This generic type injection control mechanisim is known in the rocket control art but does not utilize the particular control mechanism utilized in this invention to produce the specific thrust vector control arrangement for the rocket motor. Secondly, the gas generator 20 has characteristics such as a solid propellant grain 24 which has a burning rate which is a function of the total exhaust area of the gas generator and the surface area of the propellant grain. If the surface area of the propellant grain is held constant, the burning rate is then dependent on the exhaust area. Therefore, it can be clearly seen that by varying the burning area, the burning rate and pressure of a propellant grain can be varied. The pressure of gas in the combustion chamber of a constant burning surface area propellant varies with the exhaust area from the gas generator as follows:

$$P_2/P_1 = (A_{t1}/A_{t2})^{1/(1-n)}$$

$P_1$ = Chamber pressure when exhaust area is $A_{t1}$
$P_2$ = Chamber pressure when exhaust area is $A_{t2}$
n = Constant over a particular pressure range and less than 1 for propellants of interest.

As can be seen, applicants utilize the varying of the pressure of the gas generator to produce the pressure for the gaseous secondary injection of gas into the diverging nozzle of the rocket motor. Thirdly applicants utilize a specific vortex valve or fluid valve means with a fluidic throttling device. As illustrated in FIGS. 5 and 6, the vortex valve in this invention operates as depicted. As illustrated in FIG. 5, with no flow through control port 56, any gas produced by the gas generator flows freely from inlet opening 36 and enters vortex valve 40 radially and is exited through port 48 with no appreciable pressure drop. Therefore, the vortex valve physical exit area at 48 determines the flow rate. As illustrated in FIG. 6, if a pressure is applied through control port 56, the flow of the gas through inlet opening 36 is diverted and caused to flow in a spiral or vortex around vortex valve chamber 44 as schematically illustrated. This controlled action of the gas flowing through inlet opening 36 results in a pressure drop and a reduction in the flow rate through inlet opening 36 in proportion to the control flow through control port 56, or in effect, reduces the flow area of vortex valve 40. At maximum control through control port 56, no gas flows from the gas generator through vortex valve 40 and the effective flow area of vortex valve 40 is zero. A typical vortex valve operating characteristic curve is illustrated in FIG. 4 to illustrate the selectable characteristics for the vortex valve actually used in which Q max is flow through valve 40 or 42 with no control at control port 56 or 58, Q is flow through valve 40 or 42 controlled by flow through control port 56 or 58, Pcontrol is control pressure through control port 56 or 58, and Psupply is supply pressure through inlet opening 36 or 38.

Figure 2:
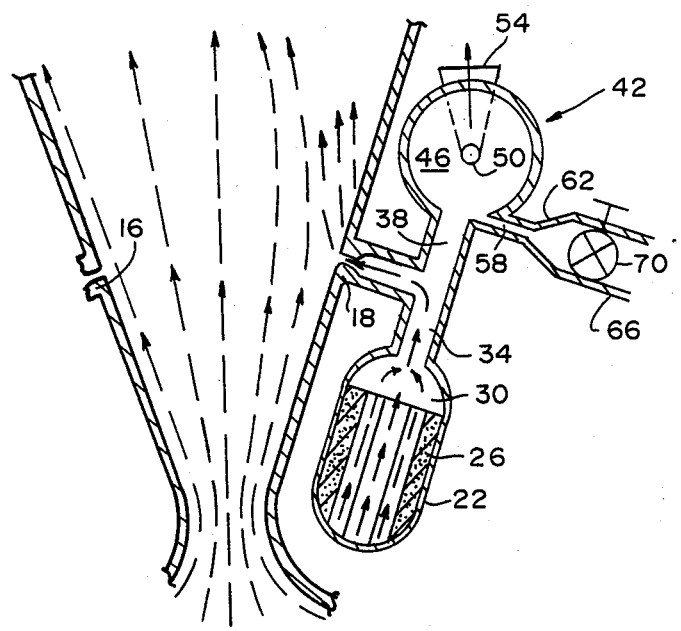
FIG. 2 is a schematic sectional view illustrating gaseous injection from one side of the rocket motor nozzle.

In operation, assuming that rocket motor 12 and hot gas generators 20 and 22 are ignited in a conventional manner and are generating gases, the gases produced by rocket motor 12 are exhausting through nozzle 14 and control valves 68 and 70 are closed which means that vortex valves 40 and 42 are open. With gas generators 20 and 22 burning, the exhaust area of secondary injection nozzle 16 plus the area of vortex valve outlet 48 constitutes the exhaust area of gas generator 20 and with the exhaust area of secondary injection nozzle 18 plus the area of vortex valve exit 50 constituting the exhaust area for gas generator 22. With this large exhaust area, the pressure in gas generators 20 and 22 and the interconnecting passages to the outlets is low and therefore, the burning rate of each of gas generators 20 and 22 is low. The gas flow out of secondary injection nozzles 16 and 18 is near zero since the pressure at the secondary injection nozzles 16 and 18 and the pressure in the gas generators under these conditions are designed to be at the same low level. Therefore, no side forces are exerted on the exhaust gases from rocket 10 and the gases from gas generators 20 and 22 are at their minimum burn rate. To generate a maximum plus side force, valve 70 is fully opened allowing control fluid pressure from inlet 66 to flow through valve 70 and control port 58 to control flow through vortex valve 42. This turns the vortex valve off at inlet opening 38 so that essentially no gas from gas generator 22 is allowed to flow out the vortex valve. Therefore, the exit area for gas generator 22 is now only the area of secondary injection nozzle 18. This decreased exit area causes the pressure in gas generator 22 to increase and therefore, the burning rate to increase. This increased gas flows through secondary injection nozzle 18 creating an oblique shock and a positive side force as illustrated in FIG. 2. By operating control valve 70 in a proportional manner, the side force produced can be proportioned from zero to the maximum amount or the amount desired. To obtain a neutral force, valve 70 is closed which opens vortex valve 42 and therefore increases the exhaust area of gas generator 22. The opening of vortex valve 42 causes the pressure in gas generator 22 and the burning rate of gas generator 22 to assume the same level as before the opening of valve 70. As before, the flow out nozzle 18 is reduced to near zero which eliminates the oblique shock and returns the side force to zero.

If a negative force in the opposite direction is desired, control valve 68 is opened to allow the pressure in gas generator 20 and the burning rate to increase and cause an oblique shock to be created as illustrated in FIG. 3. Closing of valve 68 in like manner causes gas generator 20 to return to the low pressure and low burning rate of its initial condition. As can be seen, by utilizing a small amount of control through valves 68 or 70, not only does this control the pressure of the gas delivered through nozzles 16 and 18, but also it controls the pressure and burning rate of the solid propellant of gas generators 20 and 22. This arrangement obviously saves the solid propellant for utilization when the pressure is needed and saves on the production of gas at a high pressure until a high pressure is actually needed. Therefore, the gas generator is more efficiently utilized.

We claim:

1. In combination with a reaction motor having a combustion chamber and an exhaust nozzle, a thrust vector control system comprising a plurality of gas generators with each gas generator having a passage with a nozzle therein that communicates with a diverging portion of said exhaust nozzle for discharging gases from said gas generators into said diverging portion of said exhaust nozzle angularly with respect to normal flow of exhaust gases through said exhaust nozzle, each of said gas generators also having a fluid valve means connected thereto with an inlet opening to said fluid valve means in communication with gases from its respective gas generator and a control port with valving means therein and opening into a chamber of said fluid valve means adjacent said inlet opeing to said fluid valve means for controlling flow through said control port by opening and closing said valving means, said fluid valve means having an outlet therefrom for exhausting therethrough, and each of said gas generators having such a solid propellant therein whereby when said valving means in opened for controlling flow through its respective fluid valve means, the pressure in said gas generator is caused to increase and the burning rate of said solid propellant in said gas generator is also caused to increase.

2. A device as set forth in claim 1, wherein said fluid valve means is a vortex valve and said inlet opening to said vortex valve is approximately twice the size of said outlet from said vortex valve.

3. A device as set forth in claim 2 wherein said inlet opening to said vortex valve and said control port opening in said vortex valve are mounted 90° apart and wherein said outlet from said vortex valve is located 90° from said inlet to said vortex valve.

* * * * *